July 6, 1948.                  H. W. LORD                  2,444,782
                        PULSE GENERATING CIRCUITS
                          Filed Oct. 31, 1942
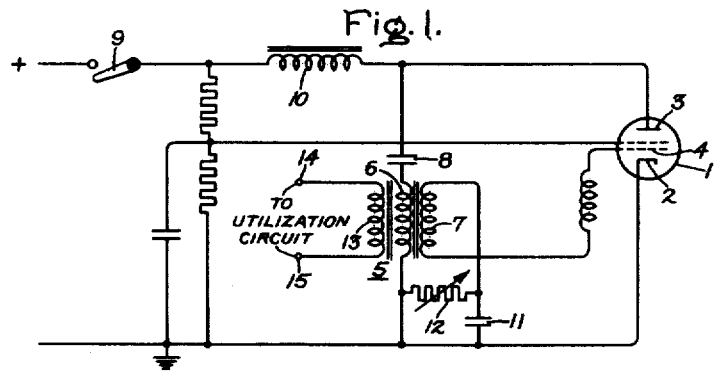
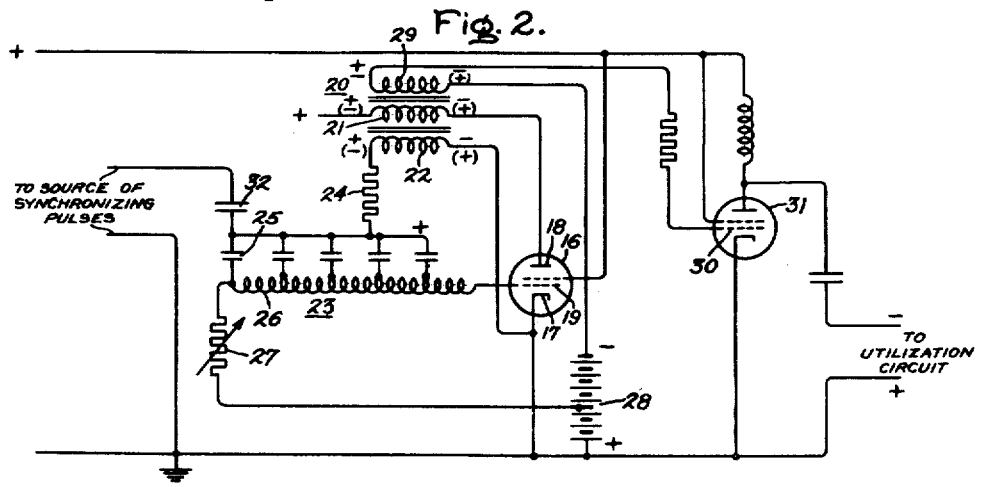
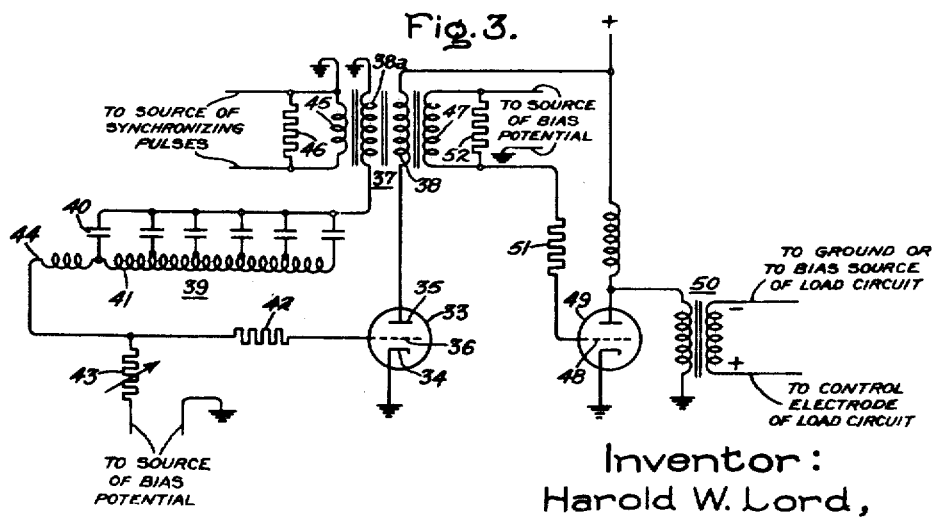
Inventor:
Harold W. Lord,
by Harry E. Dunham
His Attorney.

Patented July 6, 1948

2,444,782

UNITED STATES PATENT OFFICE 2,444,782

PULSE GENERATING CIRCUITS

Harold W. Lord, Schenectady, N. Y., assignor to General Electric Company, a corporation of New York Application October 31, 1942, Serial No. 464,033

9 Claims. (Cl. 250—36)

1

My invention relates to pulse generating circuits, particularly to such circuits for use in connection with pulse transmitters and the like, and its object is to provide improved and efficient circuits of this character which are extremely simple in form and at the same time capable of producing pulses of considerable power.

In accordance with my invention pulse generating circuits are provided constituted essentially by a single electron discharge device arranged to feed back energy from its anode-cathode circuit to its control electrode-cathode circuit through a transformer. In particular, the regenerative pulse generating circuit, comprising the single electron discharge device associated with the transformer, further comprises a pulse-forming transmission line section connected in the control electrode-cathode circuit for determining the duration of the pulses.

The novel features which are considered to be characteristic of my invention are set forth with particularity in the appended claims. My invention itself, however, both as to its organization and method of operation together with further objects and advantages thereof my best be understood by reference to the following description taken in connection with the accompanying drawing wherein Fig. 1 is a diagrammatic representation of a pulse generating circuit illustrating certain principles underlying the operation of my invention; and Figs. 2 and 3 represent various embodiments of the invention including a pulse determining transmission line in the control electrode-cathode circuit.

Referring to Fig. 1, the pulse generating circuit illustrated therein comprises an electron discharge device 1 having a cathode 2, an anode 3, and a control electrode 4. The circuit further comprises a transformer 5 having windings 6 and 7 respectively in series in the anode-cathode circuit and control electrode-cathode circuit of discharge device 1, winding 7 being oppositely poled with respect to winding 6. A capacitor 8 is connected in series with winding 6, and the series connection comprising winding 6 and capacitor 8 having the anode-cathode circuit of device 1 connected thereto is adapted to be connected to a preferably direct current source (not shown) through a switch 9 and an inductance 10. A capacitor 11 preferably shunted by an adjustable resistor 12 is included in the series connection comprising winding 7 and the control electrode-cathode circuit of discharge device 1. The transformer 5 further comprises a third or output winding 13 to the terminals 14 and 15 of which

2 any desired utilization circuit (not shown) may be connected.

In operation, upon closing of switch 9 the charging current to the capacitor 8 in series with winding 6 causes a negative potential to be impressed upon the control electrode 4 through winding 7, and therefore discharge device 1 is biased to cutoff, permitting capacitor 8 to receive the charge. After the capacitor 8 is charged, the potential on control electrode 4 becomes less negative and the discharge device 1 begins to conduct. Discharge of capacitor 8 through winding 6 is then started, the discharge current in winding 6 causing a more positive potential to be impressed upon the control electrode 4 through winding 7 and thus making the discharge device 1 all the more conducting. This regenerative action through the pulse transformer 5 occurs very rapidly so that the capacitor 8 is discharged at a high rate compared with its charging time and energy is therefore delivered through winding 13 to any utilization circuit connected thereto at a high level for a short time period.

During the above described conducting period of discharge device 1 the high positive potential impressed upon control electrode 4 causes current to flow in the control electrode-cathode circuit. This flow of current in turn charges the capacitor 11 to provide a negative bias potential on the control electrode. Further, after the capacitor 8 has discharged to a low potential the current through the winding 6 begins to decrease thereby causing a decrease in the positive potential which was impressed upon the control electrode during the rapid discharge period, and causing a corresponding decrease in the current through discharge device 1 and winding 6. Therefore, at the end of the discharge period of capacitor 8, electron discharge device 1 is quickly cut off. The charging of capacitor 8 is thus permitted to start again and the cycle of alternate charge and discharge of capacitor 8 is repeated indefinitely.

Referring to Fig. 2, the pulse generating circuit illustrated therein is similar to that of Fig. 1 in comprising an electron discharge device 16 having a cathode 17, an anode 18, and a control electrode 19, and in further comprising transformer 20 having windings 21 and 22 connected respectively in series in the anode-cathode circuit and the control electrode-cathode circuit of the discharge device 16. In the circuit of Fig. 2, however, the winding 21 in the anode-cathode circuit is connected between the anode 18 and the source (not shown) of preferably direct current. Further, in the circuit of Fig. 2, a pulse-forming and pulse-determining time delay network 23 is connected in series with the transformer winding 22 and with a resistor 24 in the control electrode-cathode circuit of discharge device 16. The time delay network 23 is shown as an artificial transmission line or line section comprising a plurality of capacitors 25 and reactors 26. An adjustable leak resistor 27 connects the line section 23 to ground or to the cathode 17 through a tap on a bias battery or like bias source 28 if desired. A third or output winding 29 of transformer 20 may be arranged in series with the bias source 28 to impress pulse potentials upon the control electrode 30 of power amplifier 31 or other stage the output of which may be supplied to any desired utilization circuit (not shown). If desired a source of synchronizing pulses (not shown) may be connected, through a capacitor 32 and the pulse-forming element 23 across the control electrode 19 and the cathode 17 of discharge device 16.

In operation of the pulse generating circuit illustrated in Fig. 2, let it be assumed that at the start of a pulse cycle, a small current is beginning to flow in the anode-cathode circuit of discharge device 16 through the winding 21. Under this condition small potentials appear across the windings of the pulse transformer 20 having polarities as indicated by the top polarity marks in the figure. The positive potential impressed upon the control electrode 19 of discharge device 16 by the winding 22 of the pulse transformer causes more anode current to flow which in turn produces more current in winding 21 and therefore more potential impressed upon control electrode 19 from winding 22. This regenerative action continues at a very rapid rate and until discharge device 16 is driven to saturation.

When discharge device 16 is approaching saturation a large proportion of the anode supply potential appears across transformer primary winding 21 and a corresponding high positive potential is impressed by secondary winding 22 upon the control electrode circuit, sufficient to cause this circuit to draw current. With the control electrode circuit of discharge device 16 drawing current, nearly all of the high positive potential thereon appears across resistor 24 and the pulse-forming line 23 constituted by the capacitors 25 and inductances 26. Assuming that the resistance of resistor 24 plus the equivalent control electrode-to-cathode resistance of discharge device 16 equals the surge impedance of the transmission line 23, then half of the secondary voltage of transformer 20 appears across the transmission line 23 and half across the resistor 24 and the control electrode-to-cathode resistance of the discharge device 16.

The potential thus impressed upon the transmission line 23 causes a wave to travel down the line which is reflected at the open end of the line and travels back to the starting end thereof in proper phase so that as the wave finishes its travel a voltage equal to all of the voltage applied by secondary 22, across the transmission line 23 and the resistance loads constituted by resistor 24 and the control electrode-to-cathode resistance, appear across the line 23 in the form of a charge on each capacitor 25 of the polarity indicated, that is, negative on the control electrode side of the line. Under this condition the potential upon control electrode 19 is reduced substantially to zero. The resulting increase in the anode circuit impedance of discharge device 16 reduces the potential across the primary winding 21 and this decrease, through regenerative action, increases in turn the negative potential applied to the control electrode 19 from winding 22 until discharge device 16 is biased to and beyond cut-off, thus ending the pulse.

At the end of the pulse the charge on the capacitors 25 leaks off at a rate determined by the leak resistor 27 until the negative bias upon the control electrode 19 is sufficiently reduced so that when the synchronizing potential is applied to the control electrode-cathode circuit through capacitor 32 another pulse will be initiated. The pulse cycle as above described may then be repeated indefinitely.

If it is desired that the pulse generating circuit of Fig. 2 be operated self-timing, the leak resistor 27 is connected directly to the cathode 17 and the synchronizing source is omitted, the pulse rate then being determined by the adjustment of resistor 27.

It will be noted that in the pulse-generating circuit illustrated in Fig. 2, in forming the pulse a single electron discharge device circuit is utilized wherein part of the anode power is fed back through a pulse transformer as regeneration to the control electrode, and wherein a pulse forming element, such as a transmission line section, in series with the control electrode determines the duration of the pulse and causes a blocking of the control electrode circuit until the latter is discharged through a resistor. It has been found that the shape and power of the output pulse from this single pulse-generating stage are such that the stage will drive directly a pulse power output stage or any suitable load. For example, in Fig. 2 the pulse generating circuit is illustrated as connected to a load circuit which requires the supplying of negative pulses thereto.

Referring to Fig. 3 wherein a modification closely similar to the system shown and described in connection with Fig. 2 is illustrated, the pulse generating circuit comprises an electron discharge device 33 having a cathode 34, an anode 35 and a control electrode 36, and further comprises a pulse transformer 37 having a primary winding 38 and a secondary winding 38a connected respectively in series in the anode-cathode circuit and the control electrode-cathode circuit of discharge device 33. The anode 35 is connected through transformer primary winding 38 to a source of direct current (not shown), and a pulse-forming and pulse-determining transmission line section 39, having capacitors 40 and inductances 41, is connected in series with the transformer secondary winding 38a and a resistance 42 in the control electrode-cathode circuit of discharge device 33. An adjustable leak resistor 43 connects the open end 44 of element 39 to ground or to cathode 34 through a source of bias potential (not shown). A winding 45 included in the pulse transformer 37 and shunted by a resistor 46 is connected to a source (not shown) of synchronizing pulses.

Operation of the pulse generating system above described in connection with Fig. 3 will be readily understood by reference to the description of operation hereinabove set forth of the system of Fig. 2. Whereas in Fig. 2 synchronizing pulses are supplied to the control electrode-cathode circuit of the electron discharge device from a synchronizing source connected to the pulse-forming transmission line section, in Fig. 3 these pulses are supplied through transformer winding 38a from a source connected to the winding 45. Otherwise operation of the system of Fig. 3 is substantially identical with that of the system of Fig. 2. A secondary winding 47 corresponding to winding 29 of Fig. 2 is provided on the pulse transformer 37 which may supply pulses to the control electrode 48 of an electron discharge device 49 representing, for example, a pulser output stage the anode-cathode circuit of which is connected to any desired utilization circuit, for example, to a load circuit requiring a positive pulse. A pulse transformer 50 is then provided to invert the output voltage of stage 49 and to match the load to the pulser output stage.

In the systems in accordance with my invention as illustrated in Figs. 2 and 3, the circuit constants vary with the ratings of the electron discharge devices and the power output required but are not extremely critical. The impedance of the pulse-forming line, 23 or 39, should be high relative to the control electrode-to-cathode impedance of the pulse-generating discharge device, and the potential impressed upon its control electrode-cathode circuit should be sufficient to produce a potential swing two or three times the swing required to drive the control electrode to saturation on the positive swing of control electrode potential. It is desirable though not essential to supply the pulses from the pulse transformer to the control electrode of the pulser output stage through a low resistance as 51 in Fig. 3, in order to minimize the effect of the control electrode loading of the output stage upon the functioning of the pulse-generating circuit. Resistors, such as 46 and 52 of Fig. 3, are provided to damp out oscillations which tends to occur in the windings of the pulse transformer directly after the termination of a pulse, since, when the secondary voltages are negative, the transformer is operating with practically no secondary load and with an open-circuited primary. The values of these damping resistors depend largely upon the particular design of the transformer which is used and upon the amount of loading and are preferably determined by test under operating conditions.

In certain practical applications of my invention in pulse generating systems, the pulse transformers were of such characteristics as to be capable of passing a pulse having a reasonably flat top characteristic curve, and wherein the maximum pulse voltage after initiation thereof was reached in from 0.10 to 0.20 microsecond, the duration of the pulse was of the order of one to two microseconds, the voltage dropped from maximum value to zero in from 0.20 to 0.30 microsecond, and the pulse repetition rate was of the order of one to four thousand times per second.

Pulse transformers having such characteristics are produced by careful design directed particularly to ensuring very low leakage reactance and distributed capacity. The latter characteristics are obtained by employing iron core materials which provide a permeability of from 200 to 300 by means of a combiantion of thin laminations, of the order of four thousandths of an inch, and a high permeability and high resistivity alloy such as a silicon-nickel-iron alloy, for example an alloy comprising approximately three per cent silicon, 42 percent nickel and 55 percent iron. The choice of suitable insulation employed in the design of the abovementioned pulse transformers depends upon the use to which a given transformer is to be put.

My invention is applicable to and has been employed in connection with various pulse generating systems differing in power output over an extremely wide range, from a few watts to outputs of the order of several hundred kilowatts for example. For these widely differing power applications of the invention it will be apparent that suitable conventional electron discharge devices of a wide variety of ratings and characteristics are readily adaptable for use in the pulse generating circuits.

The present invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent in the United States is:

1. An electric pulse generating apparatus comprising an electric discharge device having an anode, a cathode and a control electrode, a source of unidirectional current supply connected to said anode and cathode in series circuit relation with one winding of a transformer, means for rendering said discharge device conductive, means including a second winding on said transformer regeneratively connected to impress a positive bias potential upon said control electrode in response to increasing current in said anode-cathode circuit, and means for rendering said discharge device non-conductive a predetermined time after initiation of conduction therein including an artificial transmission line section connected in series circuit relation with said second winding between said cathode and said control electrode, said transmission line being energized from said second winding and connected to impress upon said control electrode a delayed negative potential which reduces said positive bias potential abruptly, thereby to render said discharge device non-conductive and to terminate the flow of current therethrough.

2. An electric pulse generating apparatus comprising an electron discharge device having an anode, a cathode and a control electrode, a source of unidirectional current supply connected to said anode and cathode in series circuit relation with one winding of a transformer, means for rendering said discharge device conductive, means including a second winding on said transformer regeneratively connected to impress a positive bias potential upon said control electrode in response to increasing current in said anode-cathode circuit thereby to increase said anode current to its saturation value and to establish a flow of current to said control electrode, and means for rendering said discharge device non-conductive a predetermined time after initiation of conduction therein including an artificial transmission line section connected in the control electrode-cathode circuit of said discharge device, said transmission line being energized from said second winding and connected to reverse the potential upon said control electrode abruptly to predetermined time after anode current saturation, thereby to render said electric discharge device non-conductive and to determine the period of a current pulse therethrough.

3. An electric pulse generating apparatus comprising an electron discharge device having an anode, a cathode and a control electrode, a source of unidirectional current supply connected to said anode and cathode in series circuit relation with one winding of a transformer, means including a second winding on said transformer regeneratively connected between said control electrode and cathode to impress upon said control electrode a positive bias potential in response to increasing current in said anode-cathode circuit thereby to increase said anode current to its saturation value and to establish a flow of current to said control electrode, and means comprising an open-circuited transmission line section connected in said control electrode-cathode circuit and energized from said second winding upon anode current saturation to develop by reflection a delayed negative bias which abruptly reduces said positive bias potential substantially to zero, thereby to render said discharge device non-conductive and to determine the period of a current pulse therethrough.

4. An electric pulse generating apparatus comprising an electron discharge device having an anode, a cathode and a control electrode, a source of unidirectional current supply connected to said anode and cathode in series circuit relation with one winding of a transformer, means including a second winding on said transformer regeneratively connected between said control electrode and said cathode to impress upon said control electrode a positive bias potential in response to increasing current in said anode-cathode circuit thereby to increase said anode current to its saturation value and to establish a flow of current to said control electrode, and an open-circuited transmission line and a resistor substantially equal in resistance to the surge impedance of said line connected in series circuit relation in said control electrode-cathode circuit, said transmission line being arranged for energization from said second transformer winding upon anode current saturation thereby to develop by reflection a delayed voltage pulse in said control electrode-cathode circuit having a polarity and magnitude such that said positive bias is reduced substantially to zero and said discharge device is rendered non-conductive, thereby to determine the period of current flow through said device.

5. An electric pulse generating apparatus comprising an electron discharge device having an anode, a cathode and a control electrode, a source of unidirectional current supply connected to said anode and cathode in series circuit relation with one winding of a transformer, means for normally maintaining said discharge device conductive, means including a second winding on said transformer regeneratively connected between said control electrode and said cathode to impress upon said control electrode a positive bias potential in response to increasing current in said anode-cathode circuit, an artificial transmission line section connected in said control electrode-cathode circuit for energization from said second winding to develop a delayed negative potential upon said control electrode sufficient to reduce said bias substantially to zero, thereby to terminate said anode current, said delayed negative potential appearing as a charge upon said transmission line section, and means for discharging said transmission line section gradually to remove said negative potential and render said discharge device conductive, thereby to determine the periodicity of anode current flow through said discharge device.

6. An electric pulse generating apparatus comprising an electron discharge device having an anode, a cathode and a control electrode, a source of unidirectional current supply connected to said anode and cathode in series circuit relation with one winding of a transformer, means including a second winding on said transformer regeneratively connected between said control electrode and cathode to impress upon said control electrode a positive bias potential in response to increasing current in said anode-cathode circuit thereby to increase said anode current to its saturation value, means comprising an open-circuited transmission line section connected in said control electrode-cathode circuit and energized from said second winding upon anode current saturation to develop by reflection a delayed negative bias which reduces said positive bias potential abruptly, thereby to render said discharge device non-conductive and to determine the period of a current pulse therethrough, and discharge means connected across said transmission line section gradually to decrease said negative bias potential thereby to render said discharge device conductive and to determine the periodicity of current pulses therethrough.

7. An electric pulse generating apparatus comprising an electron discharge device having an anode, a cathode and a control electrode, a source of unidirectional current supply connected to said anode and cathode in series circuit relation with one winding of a transformer, means including a second winding on said transformer regeneratively connected between said control electrode and said cathode to impress upon said control electrode a positive bias potential in response to increasing current in said anode-cathode circuit, thereby to increase said anode current to its saturation value, an open-circuited transmission line and a resistor substantially equal in resistance to the surge impedance of said line connected in series circuit relation in said control electrode-cathode circuit, said transmission line being arranged for energization through said resistor from said second transformer winding upon anode current saturation to develop by reflection a delayed negative voltage pulse which abruptly reduces said positive bias potential upon said control electrode, thereby to determine the period of an anode current pulse in said discharge device, and a discharge resistor connected across said transmission line to permit gradual decay of said delayed voltage pulse for rendering said discharge device conductive in determining the periodicity of said anode current pulses.

8. An electric pulse generating apparatus comprising an electron discharge device having an anode, a cathode and a control electrode, a source of unidirectional current supply connected to said anode and cathode in series circuit relation with one winding of a transformer, means for impressing upon said control electrode positive synchronizing voltage pulses of predetermined desired periodicity thereby recurrently to render said discharge device conductive, means including a second winding on said transformer regeneratively connected between said control electrode and said cathode to impress upon said control electrode a positive bias potential in response to increasing current in said anode-cathode circuit, means for rendering said discharge device non-conductive a predetermined time after initiation of conduction therein comprising an artificial transmission line section connected in said control electrode-cathode circuit, said transmission line being energized from said second winding and connected to develop a delayed negative potential which reduces said positive bias potential upon said control electrode substantially to zero, thereby to terminate said anode current, said delayed negative potential appearing as a charge upon said transmission line section, and means for discharging said transmission line section gradually to remove said negative potential 9. An electric pulse generating apparatus comprising an electron discharge device having an anode, a cathode and a control electrode, a source of unidirectional current supply connected to said anode and cathode in series circuit relation with one winding of a transformer, means including a second winding on said transformer for impressing upon said control electrode positive synchronizing voltage pulses of predetermined desired periodicity thereby recurrently to render said discharge device conductive, means including a third winding on said transformer regeneratively connected between said control electrode and said cathode to impress upon said control electrode a positive bias potential in response to increasing current in said anode-cathode circuit, means for rendering said discharge device non-conductive a predetermined time after initiation of conduction therein comprising an artificial transmission line section connected in said control electrode-cathode circuit, said transmission line being energized from said second winding and connected to impress a delayed negative potential upon said control electrode which reduces said positive bias potential abruptly, thereby to terminate said anode current, said delayed negative potential appearing as a charge upon said transmission line section, and means for discharging said transmission line section gradually to remove said negative potential, said discharge means and said synchronizing pulses jointly determining the frequency of anode current flow through said discharge device.

HAROLD W. LORD.

REFERENCES CITED

The following references are of record in the file of this patent:

UNITED STATES PATENTS

| Number | Name | Date |
| --- | --- | --- |
| Re. 20,831 | Smiley | Aug. 16, 1938 |
| 1,733,614 | Morrison | Oct. 29, 1929 |
| 2,110,245 | Stocker | Mar. 8, 1938 |
| 2,140,004 | Falloon | Dec. 13, 1938 |
| 2,165,770 | Tolson | July 11, 1939 |
| 2,212,420 | Harnett | Aug. 20, 1940 |
| 2,214,077 | Farnsworth | Sept. 10, 1940 |
| 2,406,871 | Varela | Sept. 3, 1946 |

Certificate of Correction

Patent No. 2,444,782.

July 6, 1948.

HAROLD W. LORD

It is hereby certified that errors appear in the printed specification of the above numbered patent requiring correction as follows:

Column 1, line 25, for "my best" read *may best*; column 5, line 36, for the word "tends" read *tend*; column 6, line 66, claim 2, for "abruptly to" read *abruptly a*;

and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.* by to terminate said anode current, said delayed negative potential appearing as a charge upon said transmission line section, and means for discharging said transmission line section gradually to remove said negative potential 9. An electric pulse generating apparatus comprising an electron discharge device having an anode, a cathode and a control electrode, a source of unidirectional current supply connected to said anode and cathode in series circuit relation with one winding of a transformer, means including a second winding on said transformer for impressing upon said control electrode positive synchronizing voltage pulses of predetermined desired periodicity thereby recurrently to render said discharge device conductive, means including a third winding on said transformer regeneratively connected between said control electrode and said cathode to impress upon said control electrode a positive bias potential in response to increasing current in said anode-cathode circuit, means for rendering said discharge device non-conductive a predetermined time after initiation of conduction therein comprising an artificial transmission line section connected in said control electrode-cathode circuit, said transmission line being energized from said second winding and connected to impress a delayed negative potential upon said control electrode which reduces said positive bias potential abruptly, thereby to terminate said anode current, said delayed negative potential appearing as a charge upon said transmission line section, and means for discharging said transmission line section gradually to remove said negative potential, said discharge means and said synchronizing pulses jointly determining the frequency of anode current flow through said discharge device.

HAROLD W. LORD.

REFERENCES CITED

The following references are of record in the file of this patent:

UNITED STATES PATENTS

| Number | Name | Date |
| --- | --- | --- |
| Re. 20,831 | Smiley | Aug. 16, 1938 |
| 1,733,614 | Morrison | Oct. 29, 1929 |
| 2,110,245 | Stocker | Mar. 8, 1938 |
| 2,140,004 | Falloon | Dec. 13, 1938 |
| 2,165,770 | Tolson | July 11, 1939 |
| 2,212,420 | Harnett | Aug. 20, 1940 |
| 2,214,077 | Farnsworth | Sept. 10, 1940 |
| 2,406,871 | Varela | Sept. 3, 1946 |

Certificate of Correction

Patent No. 2,444,782.

July 6, 1948.

HAROLD W. LORD

It is hereby certified that errors appear in the printed specification of the above numbered patent requiring correction as follows:

Column 1, line 25, for "my best" read *may best*; column 5, line 36, for the word "tends" read *tend*; column 6, line 66, claim 2, for "abruptly to" read *abruptly a*;

and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.*